UNITED STATES PATENT OFFICE.

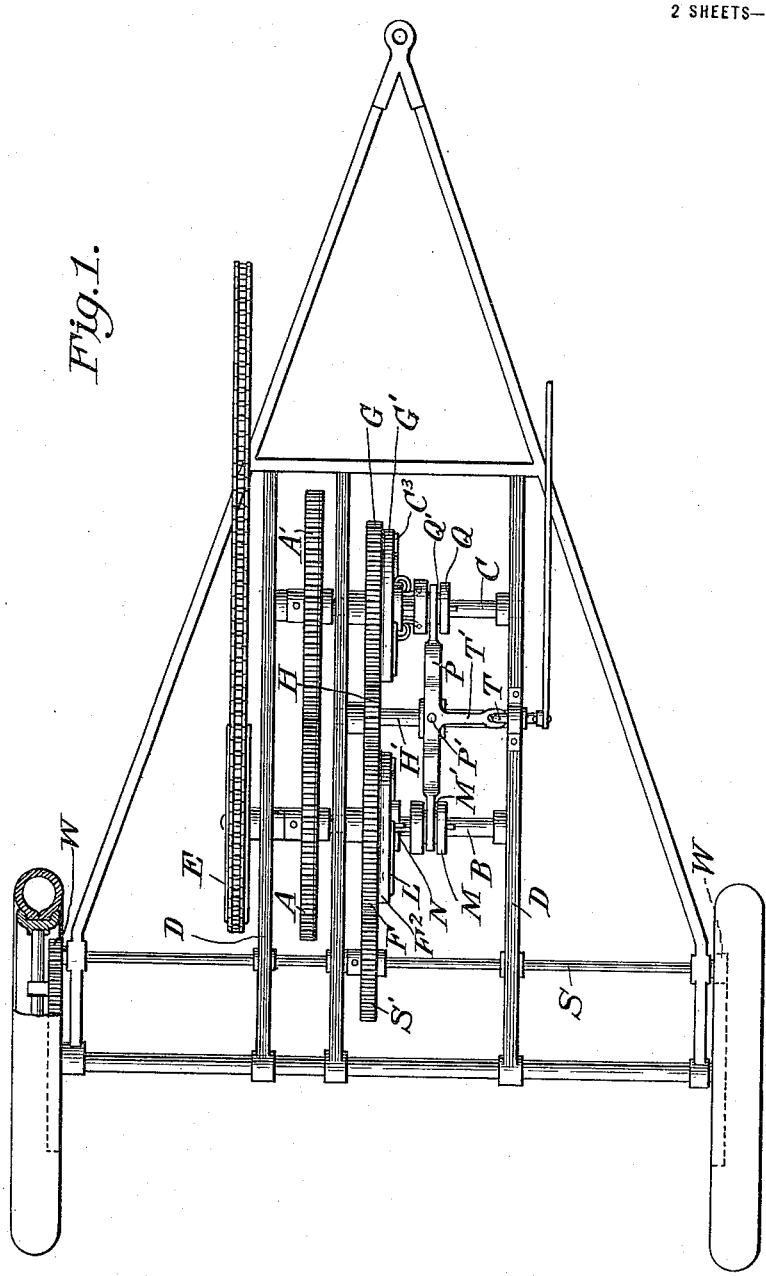

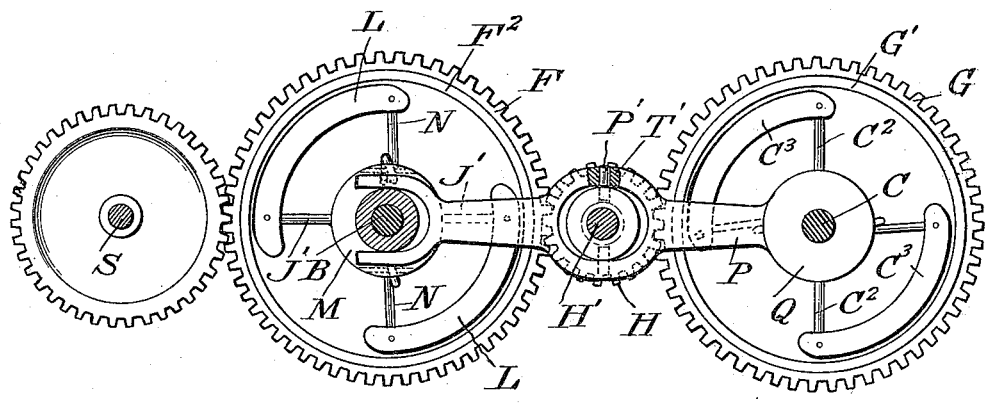
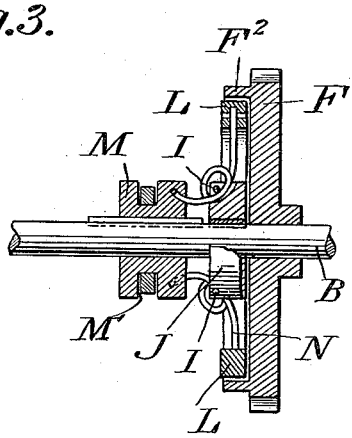
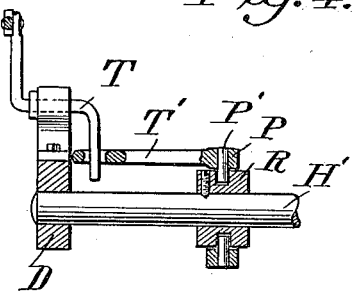

DANIEL APPLEGATE, OF LACARNE, OHIO.

GEAR MECHANISM.

1,158,882.  Specification of Letters Patent.  Patented Nov. 2, 1915.

Application filed October 22, 1914. Serial No. 868,101.

*To all whom it may concern:*

Be it known that I, DANIEL APPLEGATE, a citizen of the United States, residing at Lacarne, in the county of Ottawa and State of Ohio, have invented certain new and useful Improvements in Gear Mechanism; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in gear mechanism for automobiles and comprises a simple and efficient apparatus of this nature so arranged that, by the manipulation of clutch throwing mechanism, a forward or reverse movement may be imparted to the driving wheels of the vehicle.

My invention comprises various details of construction and combinations and arrangements of parts which will be hereinafter fully described, shown in the accompanying drawings and then specifically defined in the appended claims.

I illustrated my invention in the accompanying drawings, in which:

Figure 1 is a top plan view. Fig. 2 is a vertical sectional view showing in elevation the clutch. Fig. 3 is an enlarged detail in elevation of one of the sleeves and friction shoes mounted thereon, and Fig. 4 is a sectional view longitudinally through the shaft upon which the clutch throwing lever is mounted.

Reference now being had to the details of the drawings by letter, A and A' designate two intermeshing wheels which are keyed to the shafts B and C respectively, which are journaled in suitable bearings in the frames D.

A sprocket wheel E is fixed to the shaft B and to which power from an engine, not shown, is adapted to be supplied.

Loosely mounted upon the shaft B is a gear wheel F and a similar gear wheel G is loosely mounted upon a shaft C.

An idler H is fixed to a shaft H' which is journaled in suitable bearings in the frame and is in mesh with the two gear wheels F and G, causing the same to rotate in the same direction.

Keyed to the shaft B is a sleeve J having two fixed arms J' projecting diametrically therefrom, and L, L designate friction shoes, each pivoted at corresponding ends to the end of an arm.

Pivotally mounted upon each sleeve upon the pins I at points diametrically opposite are the resilient rods N, each bent to form a coil, one end of each being fastened to corresponding ends of the shoes and forming means whereby, as said resilient rods turn upon their pivots, the shoes will be tilted upon their pivots and affording means whereby the friction shoes may be thrown toward or away from the peripheral flange $F^2$ of the wheel F.

A clutch collar M is splined to the shaft B and has an annular groove M' and to said splined sleeve the ends of said resilient rods are pivotally connected and forming means whereby, as the collar is moved back and forth upon the shaft B, the friction shoes may be moved accordingly toward or away from the flange $F^2$.

The shaft C has a sleeve C' fixed thereto and has diametrically disposed arms $C^2$, each pivotally connected to a corresponding end of the shoes $C^3$ which engage the inner marginal edge of flange G' upon the wheel G.

A sleeve Q is splined to the shaft C and has an annular groove Q'.

P designates a clutch throwing member pivotally mounted upon a pivot P' carried by the swiveled collar R mounted upon the shaft H'. Said clutch throwing member P, which has a tilting movement, has forked ends engaging respectively the annular grooves M' and Q'.

A crank shaft, designated by letter T, is pivotally connected to a laterally extending arm T' projecting centrally from the member P and which is reinforced by the lateral braces $T^2$. Said crank shaft is journaled in suitable bearings in the frame and has any suitable link and rod connections extending to any suitable location whereby the crank shaft may be rocked accordingly as it may be desired to cause the gear mechanism to drive in one direction or in a reverse direction.

A shaft S is journaled in suitable bearings in the frame of the apparatus and to which a gear wheel S' is fixed which is in mesh with the gear wheel F, and sprocket wheels W are also fixed to the shaft S and to which sprocket chains are connected which in turn are adapted to pass over other sprocket wheels for driving the shaft of the vehicle.

The operation of my gear mechanism will be readily understood and is as follows:— When the engine is driving the gear wheels A' to the right, the gear wheel A, which intermeshes therewith, will be driven in the reverse direction by reason of the two wheels intermeshing and the two shafts B and C will move respectively. In the even of the clutch throwing member being in a neutral position, which is parallel to the plane to which the two wheels A' and A are located, the two gear wheels F and G will remain idle. In the event of it being desired to throw the clutch mechanism so that the sprocket wheels will rotate in a reverse direction to the rotary movement of the shaft B for the purpose of imparting a forward propelling movement to the vehicle, the operator by rocking the crank shaft may cause the member P to tilt so that the clutch M will be thrown toward the gear wheel F and causing the shoes L to be thrown frictionally against the flange upon the face of the wheel F, thus causing the latter to rotate with the shaft B and impart a reverse rotary movement to the shaft S', which will impart a similar movement to the sprocket wheels upon the shaft S and, through the medium of the sprocket chain, propel the vehicle forward. A reverse rocking movement to the crank shaft will cause the resilient rods mounted upon the sleeve J to tilt upon their pivots and throw the shoes out of frictional contact with the flange upon the wheel F and the clutch sleeve upon the shaft C will be thrown toward the sprocket wheel G and cause the same to rotate with the shaft C, thus reversing the movement of the gear mechanism and causing a corresponding reverse movement to the vehicle. When the gear throwing shaft P is at a neutral position, which is in a plane parallel to the plane in which the wheels A' and A are positioned, the two wheels F and G will be idle.

By the provision of an apparatus embodying the features of my invention, it will be noted that, by the simple manipulation of the machanism connected with the lever, the gear mechanism may be caused to drive the wheels forward or reversely or the wheels thrown to positions of rest.

What I claim to be new is:

1. A differential gear apparatus for driving vehicles, etc., comprising a power driven shaft and frame upon which the same is journaled, a counter shaft, intermeshing gear wheels rotating with the driving and counter shafts, loosely mounted gear wheels journaled upon the driving and counter shafts, an idler in mesh with said loosely mounted gear wheels, sleeves fixed to said shafts, arms projecting from said sleeves, friction shoes pivotally connected at corresponding ends, one to each of said arms, clutch collars splined to the shafts, resilient rods mounted upon the sleeves which rotate with said shafts and connected to said splined sleeves, each rod pivotally connected to an end of a shoe, a sprocket wheel carrying shaft and gear wheel thereon meshing with one of said loosely mounted gear wheels, and means for throwing in alternate directions said splined sleeves.

2. A differential gear apparatus for driving vehicles, etc., comprising a power driven shaft and frame upon which the same is journaled, a counter shaft, intermeshing gear wheels rotating with the driving and counter shafts, loosely mounted gear wheels journaled upon the driving and counter shafts, an idler in mesh with said loosely mounted gear wheels, sleeves fixed to said shafts, arms projecting from said sleeves, friction shoes pivotally connected at corresponding ends, one to each of said arms, clutch collars splined to the shafts, resilient rods mounted upon the sleeves which rotate with said shafts and connected to said splined sleeves, each rod pivotally connected to an end of a shoe, a sprocket wheel carrying shaft and gear wheel thereon meshing with one of said loosely mounted gear wheels, a pivotal clutch throwing member, a crank journaled in the frame and connected to said member, each end of the latter being slotted and engaging a splined sleeve.

3. A differential gear apparatus for driving vehicles, etc., comprising a power driven shaft and frame upon which the same is journaled, a counter shaft, intermeshing gear wheels rotating with the driving and counter shafts, loosely mounted gear wheels journaled upon the driving and counter shafts, an idler in mesh with said loosely mounted gear wheels, the latter having flanges projecting from the sides thereof, sleeves fixed to said shafts and rods projecting therefrom at positions diametrically opposite, shoes fixed at corresponding ends to said projections, pivotal pins upon each sleeve, resilient rods bent to form coils and pivotally mounted upon said pins, one end of each rod pivotally connected to a corresponding end of a shoe, splined clutch collars upon said shaft, means for alternately moving said splined sleeves in opposite directions to cause the shoes upon one shaft to frictionally engage and cause one or the other of said loosely mounted gear wheels to rotate with the shaft upon which it is mounted, a sprocket wheel carrying shaft, and gear connections between the same and one of said loosely mounted gears.

4. A differential gear apparatus for driving vehicles, etc., comprising a power driven shaft and frame upon which the same is journaled, a counter shaft, intermeshing gear wheels rotating with the driving and counter shafts, loosely mounted gear wheels journaled upon the driving and counter shafts, an idler in mesh with said loosely mounted gear wheels, the latter having flanges projecting from the sides thereof, sleeves fixed to said shafts and rods projecting therefrom at positions diametrically opposite, shoes fixed at corresponding ends to said projections, pivotal pins upon each sleeve, resilient rods bent to form coils and pivotally mounted upon said pins, one end of each rod pivotally connected to a corresponding end of a shoe, splined clutch collars upon said shaft, a pivotal clutch throwing member having forked ends engaging said splined sleeve and a lateral projection thereon, and a crank shaft secured to the latter and journaled in the frame thereof.

In testimony whereof I hereunto affix my signature in presence of two witnesses.

DANIEL APPLEGATE.

Witnesses:
 SCOTT STAHL,
 ANNA M. HOLLINSHEAD.

Copies of this patent may be obtained for five cents each, by addressing the "Commissioner of Patents, Washington, D. C."